United States Patent [19]

Thomas et al.

[11] Patent Number: 5,185,089

[45] Date of Patent: Feb. 9, 1993

[54] LUBRICANTS USEFUL WITH 1,1-DICHLORO-2,2,2-TRIFLUOROETHANE

[75] Inventors: Raymond H. P. Thomas; Ruth H. Chen, both of Amherst; Hang T. Pham, North Tonawanda; David P. Wilson, East Amherst, all of N.Y.

[73] Assignee: Allied-Signal Inc., Morristownship, Moms County, N.J.

[21] Appl. No.: 826,694

[22] Filed: Jan. 28, 1992

Related U.S. Application Data

[60] Division of Ser. No. 780,562, Oct. 18, 1991, Pat. No. 5,108,632, which is a continuation of Ser. No. 521,794, May 10, 1990, abandoned.

[51] Int. Cl.$^5$ .............. C10M 155/02; C10M 107/38
[52] U.S. Cl. .............................. 252/37.7; 252/49.6; 252/58; 252/68
[58] Field of Search .............. 252/49.6, 68, 32.7 E, 252/58

[56] References Cited

U.S. PATENT DOCUMENTS

| | | |
|---|---|---|
| 4,355,960 | 10/1982 | Gainer et al. |
| 4,647,391 | 3/1987 | Bertocchio et al. |
| 4,707,280 | 11/1987 | Kaimai et al. ........... 252/49.6 |
| 4,851,144 | 7/1990 | McGraw et al. |
| 4,900,463 | 2/1990 | Thomas et al. |
| 4,944,890 | 7/1990 | Deeb et al. |
| 4,946,611 | 8/1990 | Kaneko |
| 4,948,526 | 8/1990 | Fellows et al. |
| 5,049,292 | 9/1991 | Grasshoff et al. ........ 252/49.6 |
| 5,084,196 | 1/1992 | Seiki ...................... 252/49.6 |

FOREIGN PATENT DOCUMENTS

| | | |
|---|---|---|
| 116417 | 8/1984 | European Pat. Off. |
| 348724 | 1/1990 | European Pat. Off. |
| 396109 | 11/1990 | European Pat. Off. |
| 695499 | 8/1953 | Fed. Rep. of Germany |
| 60-96684A | 5/1985 | Japan |
| 61-152786A | 7/1986 | Japan |
| 1-108292A | 4/1989 | Japan |
| 1-115999 | 5/1989 | Japan |
| 118598 | 5/1989 | Japan |

*Primary Examiner*—Jacqueline Howard
*Attorney, Agent, or Firm*—Melanie L. Brown; Darryl L. Webster; Jay P. Friedenson

[57] ABSTRACT

The present invention provides a composition for use in compression refrigeration and air-conditioning comprising: (a) 1,1-dichloro-2,2,2-trifluoroethane; and (b) a sufficient amount to provide lubrication of a lubricant therefor wherein said lubricant is an aliphatic non-hydrogen containing compound, an aliphatic compound having greater than about 80 percent non-hydrogen containing atoms, or an aliphatic hydrogen-containing compound having greater than about 80 percent exterior primary hydrogens, has a viscosity of about 5 to about 150 centistokes at 37° C., and is miscible in combination with said 1,1-dichloro-2,2,2-trifluoroethane in the range of about 0° C. to at least +20° C. The compositions may further comprise an effective amount of stabilizer.

The present composition is useful in compression refrigeration and air-conditioning equipment.

20 Claims, No Drawings

5,185,089

LUBRICANTS USEFUL WITH 1,1-DICHLORO-2,2,2-TRIFLUOROETHANE

This application is a division, of application Ser. No. 780,562, filed Oct. 18, 1991, U.S. Pat. No. 5,108,632 which is a continuation of U.S. Pat. No. 521,794 filed May 10, 1990, now abandoned.

BACKGROUND OF THE INVENTION

The present invention relates to lubricants useful with 1,1-dichloro-2,2,2-trifluoroethane (known in the art as HCFC-123). HCFC-123 may replace trichlorofluoromethane (known in the art as CFC-11) in many applications because environmental concerns over the use of CFC-11 exist.

CFC-11 is currently used as a refrigerant in closed loop refrigeration systems; many of these systems are air-conditioning systems. HCFC-123 has properties similar to those of CFC-11 so that it is possible to substitute HCFC-123 for CFC-11 in refrigeration applications with minimal changes in equipment being required.

A problem arises in such a substitution. Refrigeration systems which use CFC-11 generally use mineral oils to lubricate the compressor. We have found that the use of HCFC-123 and mineral oil results in the formation of 1-chloro-2,2,2-trifluoroethane (known in the art as HCFC-133a); in the absence of mineral oil, the use of HCFC-123 does not result in the formation of HCFC-133a. E. Long et al., *Toxicol. Appl. Pharmacl.* 72. 15 (1984) report that HCFC-133a is an animal carcinogen. Understandably, the potential presence of a known animal carcinogen is unacceptable in any commercial system.

Thus, an object of this invention is to substantially reduce or even eliminate the formation of HCFC-133a in HCFC-123/lubricant systems.

U.S. Pat. No. 4,851,144 teaches HCFC-123 in combination with a lubricant of 75 weight percent propylene oxide based glycol and 25 weight percent pentaerythritol tetraester of a mixture of alkanoic acids having 7 to 9 carbons. Because this glycol contains secondary hydrogens, we believe that this system would not substantially reduce the formation of 1-chloro-2,2,2-trifluoroethane for the reasons discussed below.

Kokai Patent Publication 118,598 published May 11, 1989 teaches a broad class of fluorine containing lubricants which may be used with CFC-11, CFC-12, HCFC-123, HFC-134a, HCFC-142b, HCFC-152a, HFC-23, HCFC-22, and CFC-116. This reference does not recognize the problem addressed by the present invention or suggest the present solution set forth below.

Kokai Patent Publication 115,999 published May 9, 1989 teaches that a lubricant of an alkyl benzene and a polyoxy propylene glycol monobutyl ether may be used with a hydrogen-containing medium such as HCFC-123, HCFC-134a, HCFC-142b, HCFC-152a, HFC-23, and HCFC-22. Because the alkyl benzene and glycol both contain secondary hydrogens, we believe that if this lubricating system were used with 1,1-dichloro-2,2,2-trifluoroethane, this system would not substantially reduce the formation of 1-chloro-2,2,2-trifluoroethane for the reasons discussed below.

SUMMARY OF THE INVENTION

The present invention provides a novel solution to the foregoing problem. The present invention provides a composition for use in compression refrigeration and air-conditioning comprising: (a) 1,1-dichloro-2,2,2-trifluoroethane and (b) a sufficient amount to provide lubrication of a lubricant therefor. The lubricant is an aliphatic non-hydrogen containing compound, an aliphatic compound having greater than about 80 percent exterior non-hydrogen containing atoms, or an aliphatic hydrogen-containing compound having greater than about 80 percent exterior primary hydrogens. The lubricant has a viscosity of about 5 to about 150 centistokes at 37° C. and is miscible in combination with 1,1-dichloro-2,2,2-trifluoroethane in the range of about 0° C. to at least +20° C.

Referring to the "greater than about 80 percent exterior non-hydrogen containing atoms", the 80 percent is determined by dividing the number of exterior non-hydrogen containing atoms by the total number of exterior atoms and multiplying by 100. The term "exterior non-hydrogen containing atoms" as used herein means non-hydrogen containing atoms which are on the exterior or outside surface of the molecule and thus, are not shielded from possible reaction. The term "primary hydrogen" as used herein means a hydrogen which is bonded to a carbon atom which also has one carbon atom bonded thereto or has no carbon atom bonded thereto. The term "exterior primary hydrogens" as used herein means primary hydrogens which are on the exterior or outside surface of the molecule and thus, are not shielded from possible reaction. Referring to the "greater than about 80 percent exterior primary hydrogens", the 80 percent is determined by dividing the number of exterior primary hydrogens by the total number of exterior hydrogens and multiplying by 100.

The phrase "secondary hydrogens" as used herein means hydrogens which are bonded to carbon atoms which also have two carbon atoms bonded thereto. The phrase "tertiary hydrogens" as used herein means hydrogens which are bonded to carbon atoms which also have three carbon atoms bonded thereto. As such, if secondary hydrogens, tertiary hydrogens, or combinations thereof are present, preferably, greater than about 80 percent of these hydrogens are on the interior of the molecule and thus, shielded from possible reaction. The compound may contain heteroatoms such as silicon, fluorine, chlorine, phosphorus, nitrogen, oxygen, sulfur, and boron.

We have discovered that the presence of an aliphatic non-hydrogen containing lubricant, an aliphatic lubricant having greater than about 80 percent exterior non-hydrogen containing atoms, or an aliphatic hydrogen-containing lubricant having greater than about 80 percent exterior primary hydrogens results in a minimal formation of 1-chloro-2,2,2-trifluoroethane. This result is in contrast to the larger breakdown of HCFC-123 which occurs in the presence of mineral oil which has secondary and tertiary hydrogens.

Other advantages of the present invention will become apparent from the following description and appended claims.

DETAILED DESCRIPTION OF THE PREFERRED EMBODIMENTS

The 1,1-dichloro-2,2,2-trifluoroethane used in the present invention may be prepared by any known method including that taught by commonly assigned U.S. Pat. No. 4,145,368.

Preferably, if primary exterior hydrogens are present, the primary exterior hydrogens are present at greater than 90 percent.

Examples of preferred aliphatic hydrogen-containing lubricant having greater than about 80 percent exterior primary hydrogens which are useful in the present invention include polydimethyl siloxane, methyltrifluoropropylsiloxane, and 50:50 methyltrifluoropropyl/dimethyl siloxane copolymer. These classes of lubricants and the species listed are known and may be prepared by any method described in the art or commercially available materials may be used; for example, Dow Corning supplies silicones such as DC-200 and F-50. Mazer Chemicals supplies polydimethyl siloxane such as SF-200 (registered trademark). Methods for the preparation of methyltrifluoropropylsiloxane and 50:50 methyltrifluoropropyl/dimethyl siloxane copolymer which are useful in the present invention are taught by U.S. Pat. Nos. 2,961,425 and 4,818,423; these references are incorporated herein. Commercially available materials may also be used; for example, Dow-Corning supplies methyltrifluoropropylsiloxane as FS1265 (registered trademark). Huls Petrarch Company supplies 50:50 methyltrifluoropropyl/dimethyl siloxane copolymer.

Other useful lubricant are based on phosphorus and nitrogen such as phosphorus nitrogen polymers.

Examples of preferred aliphatic non-hydrogen containing lubricants which are useful in the present invention include perfluorinated ethers, perfluoropolyethers, and chlorotrifluoroethylene oil. These classes of lubricants and the species listed are known and may be prepared by any method described in the art. For example, methods for the preparation of perfluorinated ethers and perfluoropolyethers which are useful in the present invention are taught by U.S. Pat. Nos. 4,052,277; 4,118,398; 4,443,349; and 4,675,452; these references are incorporated herein. Commercially available materials may also be used; for example, Daikin supplies fluorinated ethers such as S-100 which are of the formula $F-[CF(CF_3)CF_2-O]_n-CF_2CF_3$. Du Pont supplies perfluoropolyethers such as Krytox which are of the formula $F-[CF(CF_3)CF_2-O]_n-CF_2CF_3$ and Daikin supplies perfluoropolyethers such as S-100 which are of the formula $F(CF_2CF_2CF_3O)CF_2CF_3$; Monte Edison also supplies perfluoropolyethers such as Fomblin which are of the formula $F-[CF(CF_3)CF_2-O]_n-CF_2CF_3$. Halocarbon supplies chlorotrifluoroethylene oil such as Halovac-100N.

The most preferred lubricants are perfluoroethers and perfluoropolyethers.

As those skilled in the art will appreciate, the amount of the lubricant required will vary depending upon the lubricant selected. Typically, about 1 to about 10 weight percent of the lubricant based on the 1,1-dichloro-2,2,2-trifluoroethane is used.

Although the lubricants used in the present invention substantially minimizes the formation of 1-chloro-2,2,2-trifluoroethane, it may be desirable to use an effective amount of stabilizers such as alpha-methyl styrene, zinc dithio dialkyl phosphate such as zinc diethyl dithio phosphate and zine hexyl dithio phosphate, zinc dialkyl dithio phosphate, zinc alkyl xanthate, and zinc dialkyl dithio carbamate to inhibit the reaction of 1,1-dichloro-2,2,2-trifluoroethane to form 1-chloro-2,2,2-trifluoroethane. As those skilled in the art will appreciate, the amount of the additive used will vary depending upon the additive and also the lubricant selected. Typically, based on the composition of 1,1-dichloro-2,2,2-trifluoroethane and the lubricant to about 0.0001 to about 5 weight percent of the additive is used.

The composition of the present invention is useful in compression refrigeration and air-conditioning equipment such as chillers for large buildings.

In a compressor, the lubricant which dissolves in the 1,1-dichloro-2,2,2-trifluoroethane refrigerant travels around the refrigeration loop and generally returns with the refrigerant to the compressor. If the lubricant separates from the refrigerant, serious operating problems could result. For example, the compressor could be inadequately lubricated if refrigerant replaces the lubricant. Significant problems in other equipment also could result if a lubricant phase separates from the refrigerant during condensation, expansion, or evaporation. In many systems including chillers, a mixture of refrigerant and lubricant circulates throughout the system. Return of the lubricant to the compressor is important. As such, the miscibility of the lubricant and the refrigerant is an important factor in selecting a lubricant.

Additionally, the lubricating properties of a potential lubricant must be satisfactory for the intended application. For automotive air conditioning, the lubricant must be sufficiently viscous at high temperatures to lubricate while remaining sufficiently fluid to circulate around the refrigeration circuit at low temperatures.

Preferably, the lubricant has a viscosity of about 15 to about 120 centistokes at 37° C. and is miscible in combination with 1,1-dichloro-2,2,2-trifluoroethane in the range of about −10° C. to at least +30° C.

The present invention also provides a method for improving the lubrication in compression refrigeration and air-conditioning equipment using 1,1-dichloro-2,2,2-trifluoroethane as a refrigerant. The method comprises the step of: employing an aliphatic non-hydrogen containing lubricant, an aliphatic lubricant having greater than about 80 percent exterior non-hydrogen containing atoms, or an aliphatic hydrogen-containing lubricant having greater than about 80 percent exterior primary hydrogens wherein the lubricant has a viscosity of about 5 to about 150 centistokes at 37° C. and is miscible in combination with 1,1-dichloro-2,2,2-trifluoroethane in the range of about 0° C. to at least +20° C. as a lubricant.

The present invention is more fully illustrated by the following non-limiting Examples.

COMPARATIVES

These Comparatives address the preparation and use of HCFC-123 with different mineral oils.

Part A—1.485 grams of HCFC-123 and 0.015 of each of the following four commercially available minerals oils: Witco LP 250 (registered trademark), Zerol 300 (registered trademark), Sunisco 3GS, and Calumet R015 were sealed in heavy walled glass tube. These mineral oils are straight chain hydrocarbons derived from petroleum. Steel, copper, and aluminum pieces were also sealed in the tube. Five centimeters Hg of air and 30 microliters of water were also included. The tubes were put into an oven for 11 days at 204° C.

The tubes were opened after the exposure and examined using gas chromatography and also gas chromatography combined with mass spectrometry. The results are shown in Table I below.

TABLE I

| Mineral Oil Type | Wt. % of HCFC-133a Formed |
| --- | --- |
| Witco LP 250 (registered trademark) | 2.9 |
| Zerol 150 (registered trademark) | 4.3 |
| Sunisco 3GS | 3.5 |
| Calumet R015 | 2.1 |

HCFC-133a was observed to vary from 2.1 to 4.3 weight percent. Other observed products were vinylidene fluoride (known in the art as HFC-1132a) and chlorodifluoroethylene (known in the art as HCFC-1122). These materials are also potentially toxic.

Part B—The foregoing was repeated at 121° C. except that air was excluded from the tube, Witco LP (registered trademark) was the only lubricant tested, and exposure time varied from 28 to 224 days. The results are in Table II below.

TABLE II

| Exposure Time (days) | Overall Wt. % of HCFC-133a Formed |
| --- | --- |
| 28 | 0.20 |
| 56 | 0.24 |
| 84 | 0.32 |
| 112 | 0.39 |
| 140 | 0.48 |
| 196 | 0.41 |
| 224 | 0.61 |

The data illustrate that HCFC-133a also formed at this temperature and that its concentration increased linearly with time.

Part C—The foregoing was repeated at 149° C. and the exposure time was 24 days. The overall weight percent of HCFC-133a formed was 2.1.

EXAMPLE 1

This Example illustrates the preparation of a composition of the invention using a dimethyl siloxane, testing of the composition for the formation of 1-chloro-2,2,2-trifluoroethane, and testing the miscibility of the 1,1-dichloro-2,2,2-trifluoroethane with the dimethyl siloxane.

A dimethyl siloxane known as SF-100 from PPG Mazer was used. 1.485 grams of 1,1-dichloro-2,2,2-trifluoroethane and 0.015 gram of dimethyl siloxane were sealed in a heavy walled glass tube. Steel, copper, and aluminum pieces were also sealed in the tube. Five centimeters of air and 30 microliters of water were also included in the tube. The tubes were placed in an oven for 11 days at 204° C. After the exposure time, 0.25 weight percent 1-chloro-2,2,2-trifluoroethane had formed. Comparing this result with the results of the Comparatives at 204° C., the present composition shows a minimization in the 1-chloro-2,2,2-trifluoroethane formed.

The miscibility of the dimethyl siloxane with HCFC-123 was evaluated. A tube with filled with the desired amount of dimethyl siloxane and then 1,1-dichloro-2,2,2-trifluoroethane was added while the dimethyl siloxane was frozen with liquid nitrogen. The tube was sealed and immersed in a thermostated bath. After the temperature was equilibrated, the miscibility of the dimethyl siloxane and 1,1-dichloro-2,2,2-trifluoroethane was determined by visual observation. The miscibility was evaluated at 1,1-dichloro-2,2,2-trifluoroethane/dimethyl siloxane weight ratios of 85:15 and 50:50. At both weight ratios, the 1,1-dichloro-2,2,2-trifluoroethane was completely miscible with the dimethyl siloxane.

EXAMPLE 2

This Example illustrates the preparation of a composition of the invention using methyltrifluoropropylsiloxane, testing of the composition for the formation of 1-chloro-2,2,2-trifluoroethane, and testing the miscibility of the 1,1-dichloro-2,2,2-trifluoroethane with the methyltrifluoropropylsiloxane.

Methyltrifluoropropylsiloxane having the formula $(CH_3)_3Si[OSi(CH_3)(CH_2CH_2CF_3)]_mOSi(CH_3)_3$ known as FS1265 (registered trademark) from Dow-Corning was used. 2.5 grams of 1,1-dichloro-2,2,2-trifluoroethane and 0.02 gram of methyltrifluoropropylsiloxane were sealed in a heavy walled glass tube. The procedure of Example 1 above was repeated except that the exposure time was 28 days and the temperature was 149° C. After the exposure time, 0.05 weight percent 1-chloro-2,2,2-trifluoroethane had formed. Comparing this result with the results of the Comparatives at 149° C. under Part C, the present composition shows a minimization in the 1-chloro-2,2,2-trifluoroethane formed. At both weight ratios, the 1,1-dichloro-2,2,2-trifluoroethane was completely miscible with the methyltrifluoropropylsiloxane.

EXAMPLE 3

This Example illustrates the preparation of a composition of the invention using 50:50 methyltrifluoropropyl/dimethyl siloxane copolymer, testing of the composition for the formation of 1-chloro-2,2,2-trifluoroethane, and testing the miscibility of the 1,1-dichloro-2,2,2-trifluoroethane with the 50:50 methyltrifluoropropyl/dimethyl siloxane copolymer.

50:50 methyltrifluoropropyl/dimethyl siloxane copolymer having the formula

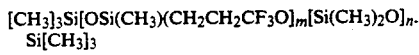

$[CH_3]_3Si[OSi(CH_3)(CH_2CH_2CF_3O)]_m[Si(CH_3)_2O]_n$-$Si[CH_3]_3$ from Huls Petrarch Company was used. 2.5 grams of 1,1-dichloro-2,2,2-trifluoroethane and 0.02 gram of 50:50 methyltrifluoropropyl/dimethyl siloxane copolymer were sealed in a heavy walled glass tube. The procedure of Example 1 above was repeated except that the exposure time was 28 days and the temperature was 149° C. After the exposure time, 0.08 weight percent 1-chloro-2,2,2-trifluoroethane had formed. Comparing this result with the results of the Comparatives at 149° C. under Part C. the present composition shows a minimization in the 1-chloro-2,2,2-trifluoroethane formed. At both weight ratios, the 1,1-dichloro-2,2,2-trifluoroethane was completely miscible with the 50:50 methyltrifluoropropyl/dimethyl siloxane copolymer.

EXAMPLE 4

A composition is prepared by combining 1,1-dichloro-2,2,2-trifluoroethane with a perfluoropolyether, testing of the composition for the formation of 1-chloro-2,2,2-trifluoroethane, and testing the miscibility of the 1,1-dichloro-2,2,2-trifluoroethane with the perfluoropolyether as set forth in Example 1 above.

EXAMPLE 5

A composition is prepared by combining 1,1-dichloro-2,2,2-trifluoroethane with a perfluorinated ether, testing the composition for formation of 1-chloro-2,2,2-trifluoroethane, and testing the miscibility of the 1,1-dichloro-2,2,2-trifluoroethane with the perfluorinated ether as set forth in Example 1 above.

EXAMPLE 6

A composition is prepared by combining 1,1-dichloro-2,2,2-trifluoroethane with a chlorotrifluoroethylene, testing the composition for formation of 1-chloro-2,2,2-trifluoroethane, and testing the miscibility of the 1,1-dichloro-2,2,2-trifluoroethane with the chlorotrifluoroethylene as set forth in Example 1 above.

EXAMPLE 7

A composition of 1,1-dichloro-2,2,2-trifluoroethane, dimethyl siloxane, and alpha-methyl styrene is prepared and tested for the formation of 1-chloro-2,2,2-trifluoroethane and miscibility of the 1,1-dichloro-2,2,2-trifluoroethane with the dimethyl siloxane as set forth in Example 1 above.

EXAMPLE 8

A composition of 1,1-dichloro-2,2,2-trifluoroethane, perfluoropolyether, and alpha-methyl styrene is prepared and tested for the formation of 1-chloro-2,2,2-trifluoroethane and miscibility of the 1,1-dichloro-2,2,2-trifluoroethane with the perfluoropolyether as set forth in Example 1 above.

EXAMPLE 9

A composition of 1,1-dichloro-2,2,2-trifluoroethane, methyltrifluoropropylsiloxane, and alpha-methyl styrene is prepared and tested for the formation of 1-chloro-2,2,2-trifluoroethane and miscibility of the 1,1-dichloro-2,2,2-trifluoroethane with the methyltrifluoropropylsiloxane as set forth in Example 1 above.

EXAMPLE 10

A composition of 1,1-dichloro-2,2,2-trifluoroethane, 50:50 methyltrifluoropropyl/dimethyl siloxane copolymer, and alpha-methyl styrene is prepared and tested for the formation of 1-chloro-2,2,2-trifluoroethane and miscibility of the 1,1-dichloro-2,2,2-trifluoroethane with the 50:50 methyltrifluoropropyl/dimethyl siloxane copolymer as set forth in Example 1 above.

EXAMPLE 11

A composition of 1,1-dichloro-2,2,2-trifluoroethane, dimethyl siloxane, and zinc dithio dialkyl phosphate is prepared and tested for the formation of 1-chloro-2,2,2-trifluoroethane and miscibility of the 1,1-dichloro-2,2,2-trifluoroethane with the dimethyl siloxane as set forth in Example 1 above.

EXAMPLE 12

A composition of 1,1-dichloro-2,2,2-trifluoroethane, perfluoropolyether, and zinc dithio dialkyl phosphate is prepared and tested for the formation of 1-chloro-2,2,2-trifluoroethane and miscibility of the 1,1-dichloro-2,2,2-trifluoroethane with the perfluoropolyether as set forth in Example 1 above.

EXAMPLE 13

A composition of 1,1-dichloro-2,2,2-trifluoroethane, methyltrifluoropropylsiloxane, and zinc dithio dialkyl phosphate is prepared and tested for the formation of 1-chloro-2,2,2-trifluoroethane and miscibility of the 1,1-dichloro-2,2,2-trifluoroethane with the methyltrifluoropropylsiloxane as set forth in Example 1 above.

EXAMPLE 14

A composition of 1,1-dichloro-2,2,2-trifluoroethane, 50:50 methyltrifluoropropyl/dimethyl siloxane copolymer, and zinc dithio dialkyl phosphate is prepared and tested for the formation of 1-chloro-2,2,2-trifluoroethane and miscibility of the 1,1-dichloro-2,2,2-trifluoroethane with the 50:50 methyltrifluoropropyl/dimethyl siloxane copolymer as set forth in Example 1 above.

EXAMPLE 15

A composition of 1,1-dichloro-2,2,2-trifluoroethane, perfluorinated ether, and zinc dithio dialkyl phosphate is prepared and tested for the formation of 1-chloro-2,2,2-trifluoroethane and miscibility of the 1,1-dichloro-2,2,2-trifluoroethane with the perfluorinated ether as set forth in Example 1 above.

EXAMPLE 16

A composition of 1,1-dichloro-2,2,2-trifluoroethane, chlorotrifluoroethylene, and zinc dithio dialkyl phosphate is prepared and tested for the formation of 1-chloro-2,2,2-trifluoroethane and miscibility of the 1,1-dichloro-2,2,2-trifluoroethane with the chlorotrifluoroethylene as set forth in Example 1 above. For Examples 5-16, we believe that the compositions would show a minimization in the 1-chloro-2,2,2-trifluoroethane formed.

Having described the invention in detail and by reference to preferred embodiments thereof, it will be apparent that modifications and variations are possible without departing from the scope of the invention defined in the appended claims.

What is claimed is:

1. A composition for use in compression refrigeration and air-conditioning comprising:
   (a) 1,1-dichloro-2,2,2-trifluoroethane; and
   (b) a sufficient amount of a lubricant therefor wherein said lubricant is an aliphatic hydrogen-containing compound having greater than about 80 percent exterior primary hydrogens, has a viscosity of about 5 to about 150 centistokes at 37° C., and is miscible in combination with said 1,1-dichloro-2,2,2-trifuloroethane in the range of about 0° C. to at least +20° C. wherein said lubricant substantially reduces the formation of 1-chloro-2,2,2-trifluoroethane.

2. The composition of claim 1 wherein said aliphatic hydrogen-containing compound having greater than about 80 percent exterior primary hydrogens is selected from the group consisting of polydimethyl siloxane, methyltrifluoropropylsiloxane, and 50:50 methyltrifluoropropyl/dimethyl siloxane copolymer.

3. The composition of claim 2 wherein said compound is polydimethyl siloxane.

4. The composition of claim 2 wherein said compound is methyltrifuloropropylsiloxane.

5. The composition of claim 2 wherein said compound is 50:50 methyltrifluoropropyl/dimethyl siloxane copolymer.

6. The composition of claim 1 which further comprises an effective amount of stabilizer to inhibit the reaction of said 1,1-dichloro-2,2,2-trifluoroethane to form 1-chloro-2,2,2-trifluoroethane.

7. The composition of claim 6 wherein said stabilizer is alpha methyl styrene.

8. The composition of claim 6 wherein said stabilizer is zinc dithio dialkyl phosphate.

9. A method for improving lubrication in compression refrigeration and air-conditioning equipment using 1,1-dichloro-2,2,2-trifluoroethane as a refrigerant comprising the step of:

employing an aliphatic hydrogen-containing lubricant having greater than about 80 percent exterior primary hydrogens wherein said lubricant has a viscosity of about 5 to about 150 centristokes at 37° C. and ismiscible in combination with 1,1-dichloro-2,2,2-trifluoroethane in the range of about 0° to at least +20° C. wherein said lubricant substantially reduces the formation of 1-chloro-2,2,2-trifluoroethane.

10. The method of claim 9 wherein said aliphatic hydrogen-containing lubricant having greater than about 80 percent exterior primary hydrogens is selected from the group consisting of polydimethyl siloxane, methyltrifluoropropyl siloxane, and 50:50 methyltrifluoropropyl/dimethyl siloxane copolymer.

11. The method of claim 10 wherein said lubricant is polydimethyl siloxane.

12. The method of claim 10 wherein said lubricant is methyltrifluoropropylsiloxane.

13. The method of claim 10 wherein said lubricant is 50:50 methyltrifluoropropyl/dimethyl siloxane copolymer.

14. The method of claim 9 which further comprises an effective amount of stabilizer to inhibit the reaction of said 1,1-dichloro-2,2,2-trifluoroethane to form 1-chloro-2,2,2-trifluoroethane.

15. The composition of claim 14 wherein said stabilizer is alpha methyl styrene.

16. The composition of claim 14 wherein said stabilizer is zinc dithio dialkyl phosphate.

17. A method of substantially reducing the formation of 1-chloro-2,2,2-trifluoroethane in compressioned refrigeration and air-conditioning equipment using 1,1-dichloro-2,2,2-trifluoroethane as a refrigerant comprising the step of:

employing an aliphatic hydrogen-containing lubricant having greater than about 80 percent exterior primary hydrogens wherein said lubricant has a viscosity of about 5 to about 150 centistokes at 37° C. and is miscible in combination with said 1,1-dichloro-2,2,2-trifuloroethane in the range of about 0° C. to at least about 20° C.

18. The method of claim 17 wherein said lubricant is polydimethyl siloxane.

19. The method of claim 17 wherein said lubricant is methyltrifluoropropylsiloxane.

20. The method of claim 17 wherein said lubricant is 50:50 methyltrifluoropropyl/dimethyl siloxane copolymer.

* * * * *